(12) United States Patent
Meier (10) Patent No.: US 7,633,919 B2
(45) Date of Patent: *Dec. 15, 2009

(54) COMMUNICATION NETWORK PROVIDING WIRELESS AND HARD-WIRED DYNAMIC ROUTING

(75) Inventor: Robert C. Meier, Cedar Rapids, IA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/552,412

(22) Filed: Oct. 24, 2006

(65) Prior Publication Data

US 2007/0121529 A1 May 31, 2007

Related U.S. Application Data

(63) Continuation of application No. 10/144,250, filed on May 13, 2002, which is a continuation of application No. 09/072,791, filed on May 5, 1998, now Pat. No. 6,407,991, which is a continuation of application No. 08/780,124, filed on Dec. 26, 1996, now Pat. No. 5,748,619, which is a continuation of application No. 08/318,154, filed on Oct. 4, 1994, now abandoned, which is a continuation-in-part of application No. 08/238,090, filed on May 4, 1994, now abandoned, which is a continuation-in-part of application No. 08/177,738, filed on Jan. 4, 1994, now abandoned, which is a continuation-in-part of application No. 08/147,766, filed on Nov. 4, 1993, now abandoned, which is a continuation-in-part of application No. 08/073,142, filed on Jun. 4, 1993, now abandoned, which is a continuation-in-part of application No.

(Continued)

(51) Int. Cl.
*H04W 4/00* (2006.01)

(52) U.S. Cl. .............. 370/338; 370/315; 370/501; 370/216

(58) Field of Classification Search .............. None
See application file for complete search history.

(56) References Cited

U.S. PATENT DOCUMENTS 3,781,815 A  12/1973  Boudreau at al.

(Continued)

FOREIGN PATENT DOCUMENTS

EP  54-935  6/1993

(Continued)

OTHER PUBLICATIONS

Norand Corporation "Owl Network Architecture", Appendix A, pp. 1-25 Rev. 1, Jan. 31, 1994.

(Continued)

*Primary Examiner*—Robert W Wilson
(74) *Attorney, Agent, or Firm*—McAndrews, Held & Malloy, Ltd.

(57) ABSTRACT

A data communication network for providing dynamic routing through both wireless and wired subnetworks to support wireless communication devices and wired remote stations is disclosed. In the wireless network, the wireless communication devices can be mobile RF terminals, while the wired remote stations might be personal computers attached to a wired subnet, such as an ethernet coaxial cable. The wireless network architecture utilizes a spanning tree configuration which provides for transparent bridging between wired subnets and the wireless subnets. The spanning tree configuration provides dynamic routing to and from wireless communication devices and remote stations attached to standard IEEE 802 LANs.

24 Claims, 8 Drawing Sheets

Related U.S. Application Data

08/058,905, filed on May 6, 1993, now abandoned, application No. 11/522,412, which is a continuation of application No. 10/144,250, filed on May 13, 2002, which is a continuation-in-part of application No. 09/531,880, filed on Mar. 21, 2000, now Pat. No. 6,400,702, which is a continuation of application No.09/089,950, filed on Jun. 3, 1998, now Pat. No. 6,084,867, which is a continuation of application No. 08/494,909, filed on Jun. 26, 1995, now abandoned, which is a continuation-in-part of application No. 08/059,447, filed on May 7, 1993, now Pat. No. 5,428, 636, which is a continuation-in-part of application No. 08/056,827, filed on May 3, 1993, now Pat. No. 5,295, 154, which is a continuation of application No. 07/769, 425, filed on Oct. 1, 1991, now abandoned, application No. 11/552,412, which is a continuation of application No. 10/144,250, filed on May 13, 2002, which is a continuation-in-part of application No. 09/960,265, filed on Sep. 21, 2001, now Pat. No. 6,714,559, which is a continuation of application No. 09/849,776, filed on May 4, 2001, now abandoned, which is a continuation of application No. 09/482,197, filed on Jan. 12, 2000, now abandoned, which is a continuation of application No. 08/941,496, filed on Sep. 30, 1997, now abandoned, which is a continuation of application No. 08/270,533, filed on Jul. 5, 1994, now Pat. No. 5,673,031, which is a continuation-in-part of application No. 07/802,348, filed on Dec. 4, 1991, now abandoned, which is a continuation-in-part of application No. 07/790,946, filed on Nov. 12, 1991, now abandoned, application No. 11/552,412, which is a continuation of application No. 10/144,250, filed on May 13, 2002, which is a continuation-in-part of application No. 10/123,873, filed on Apr. 16, 2002, now Pat. No. 6,895,450, which is a continuation of application No. 09/060,287, filed on Apr. 14, 1998, now Pat. No. 6,374, 311, which is a continuation of application No. 08/395, 555, filed on Feb. 28, 1995, now Pat. No. 5,740,366, which is a continuation of application No. 08/255,848, filed on Jun. 8, 1994, now Pat. No. 5,394,436, which is a continuation of application No. 07/970,411, filed on Nov. 2, 1992, now abandoned, which is a continuation-in-part of application No. 07/968,990, filed on Oct. 30, 1992, now abandoned, which is a continuation-in-part of application No. PCT/US92/08610, filed on Oct. 1, 1992, said application No. 07/968,990 and a continuation-in-part of application No. 07/769,425, filed on Oct. 1, 1991, now abandoned.

(56) References Cited

U.S. PATENT DOCUMENTS

| | | | |
|---|---|---|---|
| 4,063,220 A | 12/1977 | Metcalfe | |
| 4,164,628 A | 8/1979 | Ward et al. | |
| 4,247,908 A | 1/1981 | Lockhart, Jr. et al. | |
| 4,251,865 A | 2/1981 | Moore et al. | |
| 4,332,027 A | 5/1982 | Malcolm et al. | |
| 4,352,955 A | 10/1982 | Kai et al. | |
| 4,369,443 A | 1/1983 | Giallanza et al. | |
| 4,420,682 A | 12/1983 | Huber | |
| 4,449,248 A | 5/1984 | Leslie et al. | |
| 4,477,809 A | 10/1984 | Bose | |
| 4,630,314 A | 12/1986 | Smith | |
| 4,644,532 A | 2/1987 | George et al. | |
| 4,661,902 A | 4/1987 | Hochsprung | |
| 4,663,706 A | 5/1987 | Allen et al. | |
| 4,670,899 A | 6/1987 | Brody et al. | |
| 4,679,244 A | 7/1987 | Kawasaki et al. | |
| 4,689,786 A | 8/1987 | Sidhu et al. | |
| 4,706,081 A | 11/1987 | Hart et al. | |
| 4,707,829 A | 11/1987 | Pendse | |
| 4,725,992 A | 2/1988 | McNatt et al. | |
| 4,736,461 A | 4/1988 | Kawasaki et al. | |
| 4,747,126 A | 5/1988 | Hood et al. | |
| 4,748,658 A | 5/1988 | Gopal et al. | |
| 4,789,983 A | 12/1988 | Acampora et al. | |
| 4,794,649 A | 12/1988 | Fujiwara | |
| 4,804,954 A | 2/1989 | Macnak et al. | |
| 4,811,337 A | 3/1989 | Hart | |
| 4,835,372 A | 5/1989 | Gombrich et al. | |
| 4,864,559 A | 9/1989 | Perlman | |
| 4,881,271 A | 11/1989 | Yamauchi et al. | |
| 4,884,266 A | 11/1989 | Pflaumer | |
| 4,885,780 A | 12/1989 | Gopal et al. | |
| 4,910,794 A | 3/1990 | Mahany | |
| 4,916,441 A | 4/1990 | Gombrich | |
| 4,916,726 A | 4/1990 | Morley, Jr. et al. | |
| 4,924,462 A | 5/1990 | Sojka | |
| 4,926,064 A | 5/1990 | Tapang | |
| 4,940,974 A | 7/1990 | Sojka | |
| 4,942,552 A | 7/1990 | Merrill et al. | |
| 4,945,532 A | 7/1990 | Hald | |
| 4,956,783 A | 9/1990 | Teranishi et al. | |
| 4,964,121 A | 10/1990 | Moore | |
| 4,975,904 A | 12/1990 | Mann et al. | |
| 4,977,611 A | 12/1990 | Maru | |
| 4,987,571 A | 1/1991 | Haymond | |
| 4,995,099 A | 2/1991 | Davis | |
| 5,008,882 A | 4/1991 | Peterson et al. | |
| 5,018,133 A | 5/1991 | Tsukakoshi et al. | |
| 5,018,137 A | 5/1991 | Backes et al. | |
| 5,025,486 A | 6/1991 | Klughart | |
| 5,027,427 A | 6/1991 | Shimizu | |
| 5,029,183 A | 7/1991 | Tymes | |
| 5,031,098 A | 7/1991 | Miller et al. | |
| 5,031,231 A | 7/1991 | Miyazaki | |
| 5,042,083 A | 8/1991 | Ichikawa | |
| 5,055,659 A | 10/1991 | Hendrick | |
| 5,055,660 A | 10/1991 | Bertagna et al. | |
| 5,056,085 A | 10/1991 | Vu | |
| 5,058,200 A | 10/1991 | Huang et al. | |
| 5,065,003 A | 11/1991 | Wakatsuki et al. | |
| 5,070,536 A | 12/1991 | Mahany | |
| 5,081,402 A | 1/1992 | Koleda | |
| 5,087,099 A | 2/1992 | Stolarczyk | |
| 5,089,813 A | 2/1992 | DeLuca et al. | |
| 5,099,509 A | 3/1992 | Morganstein et al. | |
| 5,103,461 A | 4/1992 | Tymes | |
| 5,117,422 A | 5/1992 | Hauptschein et al. | |
| 5,119,502 A * | 6/1992 | Kallin et al. | 455/434 |
| 5,121,408 A | 6/1992 | Cai et al. | |
| 5,123,029 A | 6/1992 | Bantz et al. | |
| 5,128,932 A | 7/1992 | Li | |
| 5,128,938 A | 7/1992 | Borras | |
| 5,134,347 A | 7/1992 | Koleda | |
| 5,142,531 A | 8/1992 | Kirby | |
| 5,142,550 A | 8/1992 | Tymes | |
| 5,150,360 A | 9/1992 | Perlman et al. | |
| 5,150,361 A | 9/1992 | Wieczorek et al. | |
| 5,152,006 A | 9/1992 | Klaus | |
| 5,157,687 A | 10/1992 | Tymes | |
| 5,159,592 A | 10/1992 | Perkins | |
| 5,161,248 A * | 11/1992 | Bertiger et al. | 455/17 |
| 5,163,080 A | 11/1992 | Amoroso et al. | |
| 5,164,942 A | 11/1992 | Kamerman | |
| 5,168,498 A | 12/1992 | Adams et al. | |
| 5,170,394 A | 12/1992 | Biber et al. | |
| 5,175,537 A | 12/1992 | Jaffe | |

| | | | | | |
|---|---|---|---|---|---|
| 5,175,870 | A | 12/1992 | Mabey et al. | | |
| 5,179,555 | A | 1/1993 | Videlock et al. | | |
| 5,181,200 | A | 1/1993 | Harrison | | |
| 5,214,647 | A | 5/1993 | Komatsu | | |
| 5,230,084 | A | 7/1993 | Nguyen | | |
| 5,239,466 | A | 8/1993 | Morgan et al. | | |
| 5,241,542 | A | 8/1993 | Natarajan et al. | | |
| 5,241,691 | A | 8/1993 | Owen | | |
| 5,255,268 | A | 10/1993 | Cato et al. | | |
| 5,260,990 | A | 11/1993 | MeLampy et al. | | |
| 5,265,270 | A | 11/1993 | Stengel et al. | | |
| 5,274,666 | A | 12/1993 | Dowdell et al. | | |
| 5,276,680 | A | 1/1994 | Messenger | | |
| 5,278,831 | A | 1/1994 | Mabey et al. | | |
| 5,280,480 | A | 1/1994 | Pitt et al. | | |
| 5,280,650 | A | 1/1994 | Sobti | | |
| 5,283,568 | A | 2/1994 | Asai et al. | | |
| 5,289,378 | A | 2/1994 | Miller et al. | | |
| 5,291,479 | A | 3/1994 | Vaziri et al. | | |
| 5,291,511 | A | 3/1994 | Maher et al. | | |
| 5,293,639 | A | 3/1994 | Wilson et al. | | |
| 5,295,154 | A | 3/1994 | Meier | | |
| 5,296,849 | A | 3/1994 | Ide | | |
| 5,297,144 | A | 3/1994 | Gilbert et al. | | |
| 5,317,691 | A | 5/1994 | Traeger | | |
| 5,323,384 | A | 6/1994 | Norwood et al. | | |
| 5,331,634 | A | 7/1994 | Fischer | | |
| 5,339,316 | A | 8/1994 | Diepstraten | | |
| 5,359,320 | A | 10/1994 | Jaffe et al. | | |
| 5,361,397 | A | 11/1994 | Wright | | |
| 5,373,506 | A | 12/1994 | Tayloe et al. | | |
| 5,375,254 | A | 12/1994 | Owen | | |
| 5,377,192 | A | 12/1994 | Goodings et al. | | |
| 5,383,187 | A | 1/1995 | Vardakas et al. | | |
| 5,390,206 | A | 2/1995 | Rein et al. | | |
| 5,392,023 | A | 2/1995 | D'Avello et al. | | |
| 5,394,436 | A | 2/1995 | Meier et al. | | |
| 5,412,654 | A | 5/1995 | Perkins | | |
| 5,425,051 | A | 6/1995 | Mahany | | |
| 5,440,560 | A | 8/1995 | Rypinski | | |
| 5,461,627 | A | 10/1995 | Rypinski | | |
| 5,465,081 | A | 11/1995 | Todd | | |
| 5,471,469 | A | 11/1995 | Flammer, III et al. | | |
| 5,485,147 | A | 1/1996 | Jaffe | | |
| 5,490,139 | A | 2/1996 | Baker et al. | | |
| 5,504,746 | A | 4/1996 | Meier | | |
| 5,528,539 | A | 6/1996 | Ong et al. | | |
| 5,572,528 | A | 11/1996 | Shuen | | |
| 5,584,048 | A | 12/1996 | Wieczorek | | |
| 5,594,731 | A | 1/1997 | Reissner | | |
| 5,625,825 | A | 4/1997 | Rostoker | | |
| 5,673,031 | A | 9/1997 | Meier | | |
| 5,687,175 | A | 11/1997 | Rochester, Jr. et al. | | |
| 5,708,680 | A | 1/1998 | Gollnick et al. | | |
| 5,726,984 | A | 3/1998 | Kubler et al. | | |
| 5,740,366 | A | * | 4/1998 | Mahany et al. | 709/227 |
| 5,748,619 | A | 5/1998 | Meier | | |
| 5,828,695 | A | 10/1998 | Webb | | |
| 5,844,893 | A | 12/1998 | Gollnick et al. | | |
| 5,848,064 | A | 12/1998 | Cowan | | |
| 5,898,679 | A | 4/1999 | Brederveld et al. | | |
| 5,940,771 | A | * | 8/1999 | Gollnick et al. | 455/517 |
| 8,084,867 | | 7/2000 | Meier | | |
| 6,400,702 | B1 | 6/2002 | Meier | | |
| 6,895,450 | B2 | * | 5/2005 | Mahany et al. | 710/18 |

FOREIGN PATENT DOCUMENTS

| | | |
|---|---|---|
| EP | 281334 | 9/1998 |
| JP | 53-10206 | 1/1978 |
| JP | 53-10208 | 1/1978 |
| JP | 58159036 | 9/1983 |
| JP | 61100041 | 5/1986 |
| JP | 61251251 | 11/1986 |
| JP | 1117533 | 5/1989 |
| JP | 1119146 | 5/1989 |
| JP | 1152837 | 5/1989 |
| JP | 1143536 | 6/1989 |
| JP | 1305637 | 12/1989 |
| JP | 2-60252 | 2/1990 |
| JP | 2051922 | 2/1990 |
| JP | 3268534 | 11/1991 |
| JP | 4123628 | 4/1992 |
| JP | 4199934 | 7/1992 |
| JP | 4259140 | 9/1992 |
| JP | 5253132 | 10/1993 |
| WO | WO 92/02084 | 2/1992 |
| WO | WO 93/07691 | 4/1993 |
| WO | WO 96-10304 | 4/1996 |
| WO | 0 281 334 A2 | 9/1998 |
| WO | 0 281 334 A3 | 9/1998 |

OTHER PUBLICATIONS

Norand Corporation "STE Network Frame Formats", Appendix B, pp. 1-11 Rev. 1, Mar. 10, 1994.

L. Klelnrock and F.A. Tobagi, "Packet Switching in Radio Channels; Part IV—Stability Considerations & Dynamic Control in Carrier Sense Multiple Access," IEEE Transactions on Communications, vol. COM-25 No. 10, Oct. 1977.

L. Kleinroch & J. Silvester, "Spatial Rouse in Muttihop Packet Radio Networks," Proceedings of the IEEE V75, N1, Jan. 1987.

F. Backes, "Transparent Bridges for Interconnection of IEEE 802 LANs," IEEE Network, V2 N1 Jan. 1988. International Standard ISO/DIS 8802-2.2.

William Stallings, Local and Metropolitan Area Networks, 1997, pp. 378-383.

Owen, The DECT Radio Interface, Colloquium on CT2/CA1 and DECT Cordless Telecommunications (1990).

Backes, "Transparent Bridges for Interconnection of IEE 802 LANs," IEEE Network, vol. 2 No. 1, pp. 5-9, Jan. 1988.

L, Kleinrock and F.A. Tobagi, "Packet Switching in Radio Channels; Part IV—Stability Considerations and Dynamic Control in Carrier Sense Multiple Access," IEEE Transactions on Communications, vol. COM-25, No. 10, Oct. 1977.

M.B. Pursley, "The Role of Spread Spectrum in Packet Radio Networks," Proceedings of the IEEE, vol. 75, No. 1, Jan. 1987.

J.O. Onunga and R.W. Donaldson, "Performance Analysis of CSMA with Priority Acknowledgements (CSMA/PA) on Noisy Data Networks with Finite User Population," IEEE Transactions on Communications, vol. 39, No. 7, Jul. 1991.

L. Kleinrock and J. Silvester, "Spatial Rouse in Multihop Packet Radio Networks," Proceedings of the IEEE vol. 75, No. 1, Jan. 1987.

Fakhouri et al., "Coding And Multiple Access Techniques For Data Transmission In Land-Mobile Satellite Networks", IEEE Pacific Rim Conference On Communications, Computers And Signal Processing, pp. 410-413, May 9-10, 1991.

Glass et al., "Broad-Band Networks For LAN and Radio Applications", IEEE 38$^{th}$ Vehicular Technology Conference, pp. 44-51, Jun. 15-17, 1988.

Hashemi et al., "An Efficient Reservation System For Local Area Networks Based On CSMA/CD", IEEE Pabffic Rim Conference on Communications, Computers and Signal Processing, pp. 1-4, Jun. 1-2, 1989.

Hu et al., "Collision Resolution Algorithms For CDMA Systems", IEEE Journal On Selected Areas In Communications, Vol. 8, Ho. 4, pp. 542-554, May 1990.

Karn, "MACA—A New Channel Access Method For Packet Radio", ARRL/CRRL Amateur Radio 9$^{th}$ Computer Networking Conference, pp. 134-140, Sep. 1990.

Kleinrock et al., "Packet Switching In Radio Channels: New Conflict-Free Multiple Access Schemes", IEEE Transactions On Communications, vol. COM-28, No. 7, pp. 1015-1029, Jul. 1980.

Kleinrock, "On Queueing Problems In Random-Access Communications", IEEE Transactions On Information Theory, vol. IT-31, No. 2, pp. 166-175, Mar. 1985.

Kleinrock, "On Resource Sharing In A Distributed Communication Network", IEEE Communications Magazine, pp. 27-34, Jan. 1979.

Leiner et al., "Issues In Packet Radio Network Design", IEEE Proceedings, vol. 75, No. 1, pp. 6-20, Jan. 1987.

Onunga et al., "Personal Computer Communications On Intrabuilding Power Line LAN's Using CSMA With Priority Acknowledgements", IEEE Journal On Selected Areas In Communications, vol. 7, No. 2, pp. 180-191, Feb. 1989.

Peha et al., "Implementation Strategies For Scheduling Algorithms In Integrated-Services Packet-Switched Networks", Global Telecommunications Conference, 1991, Globecom '91, pp. 1733-1740, Dec. 2-5, 1991.

Scholl et al., "On a Mixed Mode Multiple Access Scheme For Packet-Switched Radio Channels", IEEE Transactions On Communications, vol. COM-27, No. 6, pp. 906-911, Jun. 1979.

Takagi et al., "A Tutorial On The Analysis Of Polling Systems", Computer Science Dept., Univ. Of Calif., Los Angeles, Jun. 1, 1984.

Tan et al., "A New Free-Access Collision Resolution Algorithm Based Connection Request procedure For Land Mobile Satellite Systems", INFOCOM '89, Eighth Annual Joint Conference Of The IEEE Computer And Communications Societies Proceedings, pp. 1057-1062, 1989.

Tobagi et al, "Packet Switching In Radio Channels: Part IV Stability Considerations And Dynamic Control In Carrier Sense Multiple Access", IEEE Transactions On Communications, vol. COM-25, No. 10, pp. 1130-1119, Oct. 1977.

Tobagi et al., "Packet Radio And Satellite Networks", IEEE Communications Magazine, vol. 22, No. 11, pp. 24-40, Nov. 1984.

Tobagi et al., "Packet Switching In Radio Channels : Part III-Polling and (Dynamic) Split-Channel Reservation Multiple Access", IEEE Transactions On Communications, vol. COM-24, No. 8, pp. 832-845, Aug. 1976.

Tobagi et al., "Packet Switching In Radio Channels: Part I-Carrier Sense Multiple-Access And Their Throughput-Delay Characteristics", IEEE Transactions On Communications, vol. CCOM-23, No. 12, pp. 1400-1416, Dec. 1975.

Tobagi et al., "Packet Switching In Radio Channels: Part II-The Hidden Terminal Problem In Carrier Sense Multiple-Access And The Busy-Tone Solution", IEEE Transactions On Communications, vol. CCOM-23, No. 12, pp. 1417-1433, Dec. 1975.

Tobagi, "Multiaccess Protocols in Packet Communication System", IEEE Transactions on Communications, Vol. COM-28, No. 4, pp. 468-488, Apr. 1980.

Yue, "Performance Analysis of Cellular Mobile Radio Systems Using Slotted ALOHA Protocol With Capture", IEEE Pacific Rim Conference On Communications, Computers And Signal Processing, pp. 550-553, May 9-10, 1991.

Fakhouri et al., "Coding And Multiple Access Techniques For Data Transmission In Land-Mobile Satellite Networks", IEEE Pacific Rim Conference On Communications, Computers And Signal Processing, pp. 410-413, May 9-10, 1991.

Glass et al., "Broad-Band Networks For LAN And Radio Applications", IEEE 38th Vehicular Technology Conference, pp. 44-51, Jun. 15-17, 1988.

Hashemi et al., "An Efficient Reservation System For Local Area Networks Based On CSMA/CD", IEEE Pacific Rim Conference On Communications, Computers And Signal Processing, pp. 1-4, Jun. 1-2, 1989.

Hu et al., "Collision Resolution Algorithms For CDMA Systems", IEEE Journal On Selected Areas In Communications, vol. 8, Ho. 4, pp. 542-554, May 1990.

Karn, "MACA—A New Channel Access Method For Packet Radio", ARRL/CRRL Amateur Radio 9th Computer Networking Conference, pp. 134-140, Sep. 1990.

Kleinrock et al., "Packet Switching In Radio Channels: New Conflict-Free Multiple Access Schemes", IEEE Transactions On Communications, vol. COM-28, No. 7, pp. 1015-1029, Jul. 1980.

Kleinrock, "On Queueing Problems In Random-Access Communications", IEEE Transactions On Information Theory, vol. IT-31, No. 2, pp. 166-175, Mar. 1985.

Kleinrock, "On Resource Sharing In A Distributed Communication Network", IEEE Communications Magazine, pp. 27-34, Jan. 1979.

Leiner et al., "Issues In Packet Radio Network Design", IEEE Proceedings, vol. 75, No. 1, pp. 6-20, Jan. 1987.

Onunga et al., "Personal Computer Communications On Intrabuilding Power Line LAN's Using CSMA With Priority Acknowledgements", IEEE Journal On Selected Areas In Communications, vol. 7, No. 2, pp. 180-191, Feb. 1989.

Peha et al., "Implementation Strategies For Scheduling Algorithms In Integrated-Services Packet-Switched Networks", Global Telecommunications Conference, 1991, Globecom '91, pp. 1733-1740, Dec. 2-5, 1991.

Scholl et al., "On A Mixed Mode Multiple Access Scheme For Packet-Switched Radio Channels", IEEE Transactions On Communications, vol. COM-27, No. 6, pp. 906-911, Jun. 1979.

Takagi et al., "A Tutorial On The Analysis Of Polling Systems", Computer Science Dept., Univ. Of Calif., Los Angeles, Jun. 1, 1984.

Tan et al., "A New Free-Access Collision Resolution Algorithm Based Connection Request procedure For Land Mobile Satellite Systems", Infocom '89, Eighth Annual Joint Conference Of The IEEE Computer And Communications Societies Proceedings, pp. 1057-1062, 1080.

Tobagi et al, "Packet Switching In Radio Channels: Part IV Stability Considerations And Dynamic Control In Carrier Sense Multiple Access", IEEE Transactions On Communications, Vol. COM-25, No. 10, pp. 1130-1119, Oct. 1977.

Tobagi et al., "Packet Radio And Satellite Networks", IEEE Communications Magazine, vol. 22, No. 11, pp. 24-40, Nov. 1984.

Tobagi et al., "Packet Switching In Radio Channels : Part III-Polling and (Dynamic) Split-Channel Reservation Multiple Access", IEEE Transactions On Communications, vol. COM-24, No. 8, pp. 832-845, Aug. 1976.

Tobagi et al., "Packet Switching In Radio Channels: Part I-Carrier Sense Multiple-Access And Their Throughput-Delay Characteristics", IEEE Transactions On Communications, vol. CCOM-23, No. 12, pp. 1400-1416, Dec. 1975.

Tobagi et al., "Packet Switching In Radio Channels: Part II-The Hidden Terminal Problem In Carrier Sense Multiple-Access And The Busy-Tone Solution", IEEE Transactions On Communications, vol. CCOM-23, No. 12, pp. 1417-1433, Dec. 1975.

Tobagi, "Multiaccess Protocols In Packet Communication System", IEEE Transactions On Communications, vol. COM-28, No. 4, pp. 468-488, Apr. 1980.

Yue, "Performance Analysis Of Cellular Mobile Radio Systems Using Slotted ALOHA Protocol With Capture", IEEE Pacific Rim Conference On Communications, Computers And Signal Processing, pp. 550-553, May 9-10, 1991.

Johnson, "Thoughts on an Adaptive Link Level Protocol." Tucson Amateur Packet Radio Colorado Springs, 1989.

Sidhu et al., "Inside Appletalk", Second Edition, Addison-Wesley Publishing Company, Inc., 1990.

Claim Construction Order for U.S. Patent No. 6,714,559.

Backes, "Spanning Tree Bridges, Transparent Bridges for Interconnection of IEEE 802 LANS", IEEE Network, vol. 2, No. 1, Jan. 1988.

Huang et al., "Throughput Analysis And Protocol Design For CSMA and BTMA Protocols Under Noisy Environments", IEEE Proceedings-I, vol. 139, No. 3, Jun. 1992.

Kiesel et al., "A New CSMA-CD Protocol for Local Area Networks with Dynamic Priorities and Low Collision Probability", IEEE Journal on Selected Areas in Communications, vol. SAC-1, No. 5, Nov. 1983.

Kleinrock et al, "Spatial Reuse in Multihop Packet Radio Networks", Proceedings of the IEEE, vol. 75, No. 1, Jan. 1987.

Marsan et al., "Multichannel Local Area Network Protocols", IEEE Journal on Selected Areas in Communications, vol. SAC-1, No. 5, Nov. 1983.

Onunga et al., "Performance Analysis of CSMA with Priority Acknowledgments (CSMA/PA) on Noisy Data Networks with Finite User Population", IEEE Transactions on Communications, vol. 29, No. 7, Jul. 1991.

Pursley, "The Role of Spread Spectrum in Packet Radio Networks", Proceedings of the IEEE, vol. 75, No. 1, Jan. 1987.

Takagi et al., "Throughput Analysis for Persistent CSMA Systems", IEEE Transactions on Communications, vol. Com-33, No. 7, Jul. 1985.

Tsao, "A Local Area Network Architecture Overview, Defining LAN Environments and User Needs", IEEE Communications Magazine vol. 22, No. 8, Aug. 1984.

Yang, Yaling and Kravets, Robin, "Contention-Aware Admission Control for Ad Hoc Networks", IEEE Transactions on Mobile Computing, vol. 4, No. 4, Jul. 2005-Aug. 2005.

Fapojuwo et al., "Message and Packet Access Delays in CSMA-CD Local Area Networks", In Proceedings of the 8th Annual Joint Conference of the IEEE Comptuer and Communications Societies, INFOCOM'89, "Technology: Emerging or Converging?" pp. 849-857, vol. 3, Call No. 10.1109/INFOCOM.1989.101535, Apr. 27, 1989.

Fapojuwo et al., "Multipacket Message Transmission on CSMA-CA LANs using Limited and Gated Strategies", In Proceedings of the IEEE Pacific Rim Conference on Communcations, Computers and Signal Processing, pp. 12-15, Call No. 10.1109/PACRIM.1989.48294, Jun. 2, 1989.

Fapojuwo et al., "Stability Consideration of Buffered CSMA/CD System with Multipacket Messages", Electronics Letters, vol. 25, No. 2, pp. 122-124, Jan. 29, 1989.

M.B. Pursley, "The Role of Spread Spectrum in Packet Radio Networks," Proceedings of the IEEE, vol. 75, No. 1, Jan. 1987.

J.O. Onunga & R.W. Donaldson, "Performance Analysis of CSMA with Priority Acknowledgements on Noisy Data Networks with Finite User Population," IEEE Transaction on Comm., V. 39, No. 7, Jul. 1991.

A.S. Tannenbaum, "Computer Networks," Prentice Hall, Second Edition, 1988.

D.E. Comer, "Internetworking with TCP/IP," Prentice Hall, 1988.

Biba, A Hybrid Wireless MAC Protocol Supporting Asynchronous and Synchronous MSDU Delivery Services, IEEE P802.11/91-92, Sep. 1991.

Cheah, A Proposed Architecture and Access Protocol Outline for the IEEE 802.11 Radio LAN Standards, Part II, Document IEEE P802.11/91-54, Mar. 1991.

Cox, A Radio System Proposal for Widespread Low-Power Tetherless Communications, IEEE Transactions on Communications, vol. 39, No. 2, Feb. 1991.

Natarajan et al., Battery Efficient Operation of Radio MAC Protocol, Document IEEE P802.11/91-102, Sep. 1991.

Rypinski, Power-Drain Considerations for Full Time and Sleep Mode Radio Receivers, Document IEEE P802.11/91-99, Sep. 1991.

Haine, A New Radio Access Protocol and Network Architecture for Mobile Packet Data, 41$^{st}$ IEEE Ventricular Technology Conference, May 19-22, 1991.

International Standard ISO/DIS 8802-2.2, 1987.

Andrews, et al., "Inside Apple Talk, 2$^{nd}$ Edition", Addison-Wesley Publishing Company, 1990.

Plaintiff and Counterdefendant Qualcomm Incorporated's Preliminary Invalidity Contentions For U.S. Patent Nos. 5,500,872, 5,627,412, 5,946,344, 6,075,807, 6,320,896, And 6,714,559, Jul. 21, 2006.

Johnson, "Thoughts on an Adaptive Link Level Protocol", ARRL 8$^{th}$ Computer Networking Conference 1989, Oct. 7, 1989.

Tanenbaum, Computer Networks, Prentice-Hall, Inc., 1981.

Tanenbaum, Computer Networks, 2$^{nd}$ Edition, Prentice-Hall, Inc., 1988.

Case Management Order in *Qualcomm Inc. v. Broadcom Corp.*, 05-cv-1392 B (BLM), Dec. 12, 2005.

Expert Report of Zygmunt J. Haas, Ph.D. Regarding the Invalidity of U.S. Patent 6,714,559, Nov. 27, 2006.

Expert Report of Peter McGuiggan, Regarding the Invalidity of U.S. Patent 6,714,559, Dec. 18, 2006.

Qualcomm Prior Art list for 6,714,559, Dec. 13, 2006.

* cited by examiner

COMMUNICATION NETWORK PROVIDING WIRELESS AND HARD-WIRED DYNAMIC ROUTING

CROSS-REFERENCE TO RELATED APPLICATIONS

The present application is a CONTINUATION of U.S. patent application Ser. No. 10/144,250, filed May 13, 2002, which is a CONTINUATION of U.S. application Ser. No. 09/072,791, filed May 5,1998, issued U.S. Pat. No. 6,407,991, which is a CONTINUATION of U.S. application Ser. No. 08/780,124, filed Dec. 26, 1996, issued U.S. Pat. No. 5,748,619, which is a CONTINUATION of U.S. application Ser. No. 08/318,154, filed Oct. 4, 1994, abandoned, which is a CONTINUATION-IN-PART of U.S. application Ser. No. 08/238,090, filed May 4, 1994, abandoned, which is a CONTINUATION-IN-PART of U.S. application Ser. No. 08/177,738, filed Jan. 4, 1994, abandoned, which is a CONTINUATION-IN-PART of U.S. application Ser. No. 08/147,766, filed Nov. 4, 1993, abandoned, which is a CONTINUATION-IN-PART of U.S. application Ser. No. 08/073,142, filed Jun. 4, 1993, abandoned, which is a CONTINUATION-IN-PART of U.S. application Ser. No. 08/058,905, filed May 6, 1993, abandoned.

The present application is a CONTINUATION of U.S. patent application Ser. No. 10/144,250, filed May 13, 2002, which is a CONTINUATION-IN-PART of U.S. application Ser. No. 09/531,880, filed Mar. 21, 2000, issued U.S. Pat. No. 6,400,702, which is a CONTINUATION of U.S. application Ser. No. 09/089,950, filed Jun. 3, 1998, issued U.S. Pat. No. 6,084,867, which is a CONTINUATION of U.S. application Ser. No. 08/494,909, filed Jun. 26, 1995, abandoned, which is a CONTINUATION-IN-PART of U.S. application Ser. No. 08/059,447, May 7, 1993, issued U.S. Pat. No. 5,428,636, which is a CONTINUATION-IN-PART of U.S. application Ser. No. 08/056,827, filed May 3, 1993, issued U.S. Pat. No. 5,295,154, which is a CONTINUATION of U.S. application Ser. No. 07/769,425, filed Oct. 1, 1991, abandoned.

The present application is a CONTINUATION of U.S. patent application Ser. No. 10/144,250, filed May 13, 2002, which is a CONTINUATION-IN-PART of U.S. application Ser. No. 09/960,265, filed Sep. 21, 2001, issued U.S. Pat. No. 6,714,559, which is a CONTINUATION of U.S. application Ser. No. 09/849,776, filed May 4, 2001, abandoned, which is a CONTINUATION of U.S. application Ser. No. 09/482,197, filed Jan. 12, 2000, abandoned, which is a CONTINUATION of U.S. application Ser. No. 08/941,496, filed Sep. 30, 1997, abandoned, which is a CONTINUATION of U.S. application Ser. No. 08/270,533, filed Jul. 5, 1994, issued U.S. Patent No. 5,673,031, which is a CONTINUATION-IN-PART of U.S. application Ser. No. 07/802,348, filed Dec. 4, 1991, abandoned, which is a CONTINUATION-IN-PART of U.S. application Ser. No. 07/790,946, filed Nov. 12, 1991, abandoned.

The present application is a CONTINUATION of U.S. patent application Ser. No. 10/144,250, filed May 13, 2002, which is a CONTINUATION-TN-PART of U.S. application Ser. No. 10/123,873, filed Apr. 16, 2002, issued U.S. Pat. No. 6,895,450, which is a CONTINUATION of U.S. application Ser. No. 09/060,287, filed Apr. 14, 1998, issued U.S. Pat. No. 6,374,311, which is a CONTINUATION of U.S. application Ser. No. 08/395,555, filed Feb. 28, 1995, issued U.S. Pat. No. 5,740,366, which is a CONTINUATION of U.S. application Ser. No. 08/255,848, filed Jun. 8, 1994, issued U.S. Pat. No. 5,394,436, which is a CONTINUATION of U.S. application Ser. No. 07/970,411, filed Nov. 2, 1992, abandoned, which is a CONTINUATION-IN-PART of U.S. application Ser. No. 07/968,990, filed Oct. 30, 1992, abandoned, which is a CONTINUATION-IN-PART of PCT International Application No. PCT/US92/08610, filed Oct. 1, 1992. Said U.S. application Ser. No. 07/968,990, filed Oct. 30, 1992, abandoned, is also a CONTINUATION-IN-PART of U.S. application Ser. No. 07/769,425, filed Oct. 1, 1991, abandoned.

INCORPORATION BY REFERENCE

Applicant hereby incorporates by reference the following patent applications in their entirety:
1) U.S. application Ser. No. 08/238,090, filed May 4, 1994, by Robert C. Meier;
2) U.S. application Ser. No. 08/177,738, filed Jan. 4, 1994, by Robert C. Meier;
3) U.S. application Ser. No. 08/147,766, filed Nov. 4, 1993, by Robert C. Meier;
4) U.S. application Ser. No. 08/073,142, filed Jun. 4, 1993, by Robert C. Meier;
5) U.S. application Ser. No. 08/058,905, filed May 6, 1993, by Robert C. Meier;
6) U.S. application Ser. No. 07/769,425, filed Oct. 1, 1991, by Meier et al.; and
7) PCT Application Ser. No. PCT/US92/08610, filed Oct. 1, 1992, by Meier et al.

BACKGROUND OF THE INVENTION

The present invention relates to a wireless and wired communication network used to maintain communication pathways among wireless communication devices and remote stations. As is well known, wired local area networks ("LANS"), such as ethernet utilizing coaxial or twisted pair cabling ("wiring"), provide communication among remote stations, such as personal computers, which are commonly wired to a wired LAN. Hereinafter, a wired LAN is referred to as a "wired subnet". To maintain communication beyond the wired range of ethernet, for example, bridging devices are employed to route information between one wired section of ethernet to another wired section. The bridging devices forward communication from one side of the bridging device onto the other, and vice versa. Smarter bridging devices are also known which keep track of the location of the remote stations so that forwarding only occurs when necessary.

As is also well known, in typical wireless communication networks, wireless communication generally occurs directly between two or more wireless terminals. To overcome transmission range limitations, such wireless networks have included wireless relaying transceivers to relay received communication, extending the range at which communication can be maintained. However, depending on the mode of wireless communication, many wireless relaying transceivers may be needed to adequately serve the network requirements.

In earlier wireless communication systems, the wireless relaying transceivers were also used to manage communication among a variety of wireless communication devices. Such relaying transceivers have been called base stations. The base station were typically connected directly to a host computer through multi-dropped connections to an ethernet communication line. To communicate between a wireless communication device and a host computer, in such a system, the wireless communication device sends data to a base station, and the base station passes the data along a hard-wired ("wired") link to the host computer.

In order to cover a larger area with a wireless communication system and to take advantage of the de-regulation of the spread-spectrum radio frequencies, later-developed wireless communication systems are organized into layers of base stations. As in earlier wireless communications systems, a typical system includes multiple base stations which communicate directly with wireless terminals and the host computer.

In such wireless networks, difficulties often arise in maintaining the integrity of wireless communications. The wireless communication network must be able to handle both wireless and wired connectivity, efficient routing of data information, wireless communication device mobility, and interference from many different sources.

Customarily, wired local area networks support wireless communication devices that occupy fixed locations. Message traffic to and from such devices are routed via paths that do not change with time. Absence of a communication link to a device reflects a fault condition, i.e., a breakdown in some network component.

Thus, one object of the present invention is to route data through a wired and wireless communication network efficiently, dynamically, and without looping.

Another object of the present invention is to make the routing of data transparent to wireless terminals and remote stations located on IEEE 802.3 type subnets.

It is a further object of the present invention for the network to be capable of handling wireless communication device mobility and lost network nodes with minimal impact on the entire data communication system.

It is a still further object of the invention to allow wireless mobile computing devices, a type of wireless communication device, to move freely within wireless networks consisting of many relay nodes while transparently maintaining network connectivity with a plurality of wired subnets.

SUMMARY OF THE INVENTION

The present invention solves many of the foregoing problems using a communication network comprising two wired subnets, a wired access point connected to each of the subnets, and a plurality of intermediate wireless access points. The plurality of intermediate wireless access points provide a wireless pathway between the wired access points connected to the two subnets. Together, the two wired access points and the plurality of intermediate wireless access points form a spanning tree which interconnects the two subnets.

In another embodiment of the invention, the network may also comprise a plurality of terminal nodes which utilize the wired access points and the plurality of intermediate wireless access points to communicate on the network.

In a further embodiment of the invention, the network may also comprise a remote station attached to each of the two wired subnets. The wired access points and the plurality of intermediate wireless access points maintain communication connectivity between the two remote stations.

In addition, the network may further comprise a wireless communication device which utilizes the two wired access points and the plurality of intermediate wireless access points to communicate with the two remote stations.

In a still further embodiment, the network may also comprise a third subnet and a third wired access point connected thereto. The third wired access point participates in the spanning tree, and, along with the other two wired access points and the plurality of intermediate wireless access points, communicatively interconnects the three wired subnets. The network may also comprise a plurality of wireless communication devices which utilize the three wired access points and the plurality of intermediate wireless access points to communicate with the three subnets.

The full details of the subject invention will become apparent from the following detailed description taken in conjunction with the drawings.

DETAILED DESCRIPTION OF THE INVENTION

Figure 1:
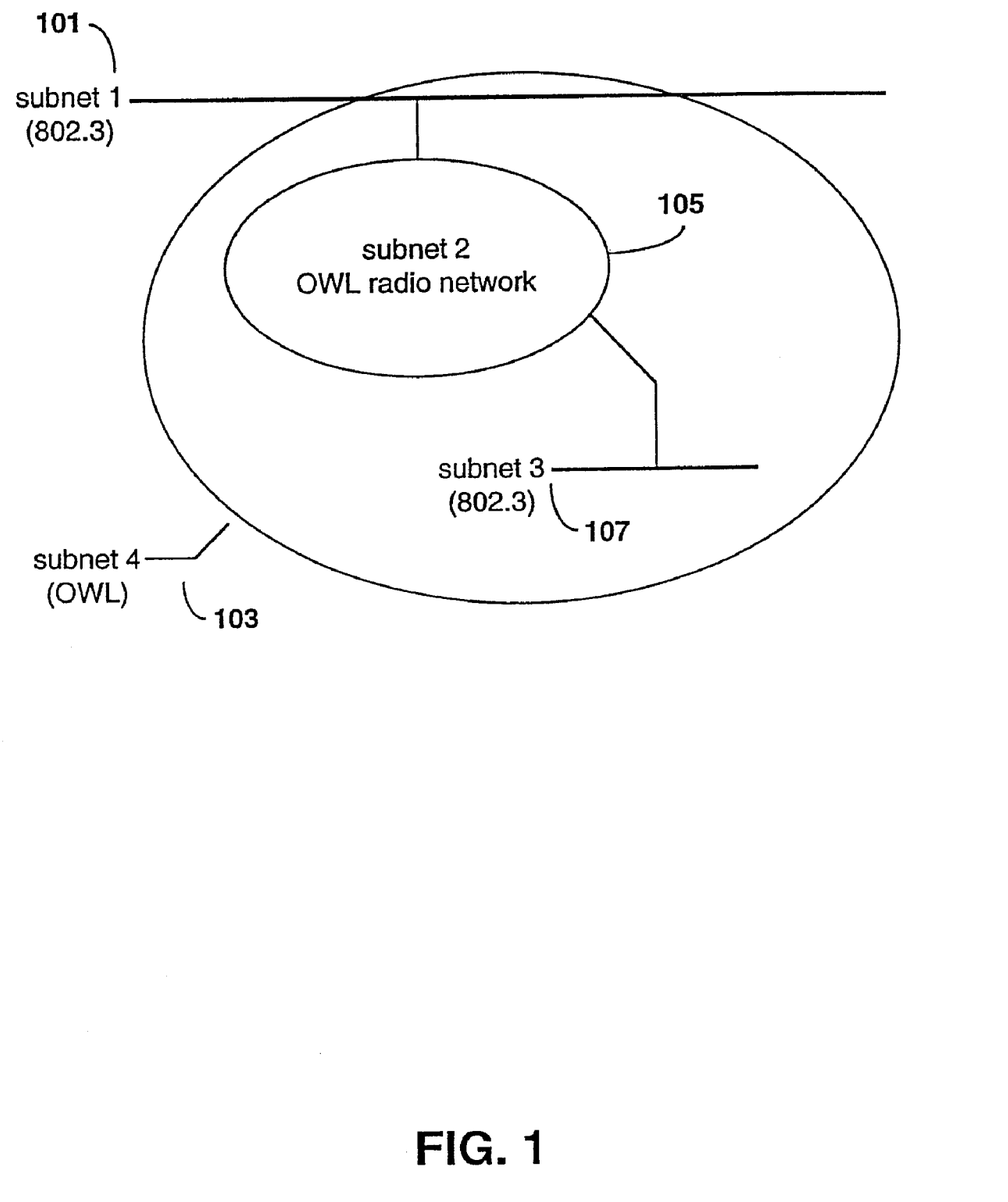
FIG. 1 illustrates the overall open wireless local area network (OWL) architecture according to the present invention.

FIG. 1 illustrates the overall open wireless local area network (OWL) architecture according to the present invention. Specifically, per IEEE (Institute of Electrical and Electronic Engineers) 802.3 Wired Local Area Network (LAN) Specifications, two subnets, a wired subnet 101 and a remote, wired subnet 107 are illustrated. The subnets 101 and 107 are wired LAN's built in accordance with the IEEE 802 specifications. According to the present invention, a third subnet, a wireless subnet 105, transparently interconnects the wired subnets 101 and 107. The wireless subnet 105 is referred to herein as an OWL radio network. Moreover, for reference herein, the wireless subnet 105 and the remote, wired subnet 107, together are referred to as an OWL subnet 103. Although, the wired subnet 101 is not part of the OWL subnet 103, it constitutes a distribution LAN for the OWL subnet 103.

Depending on the specific implementation, an OWL radio network can function (i) as a stand-alone LAN to support wireless communication between wireless communication devices, (ii) as a wireless subnet to a wired LAN to provide wireless access to and between wireless communication devices, (iii) as a wireless subnet to a wired LAN to provide access to remote wired subnets, or (iv) as a wireless subnet to a wired LAN to provide access between the wired LAN, remote wired subnets and wireless communication devices. For example, as illustrated, the wireless subnet 105 provides for communication between the wired subnet 101, the remove subnet 107, and wireless communication devices (not shown in FIG. 1) within the wireless subnet 105.

Figure 2:
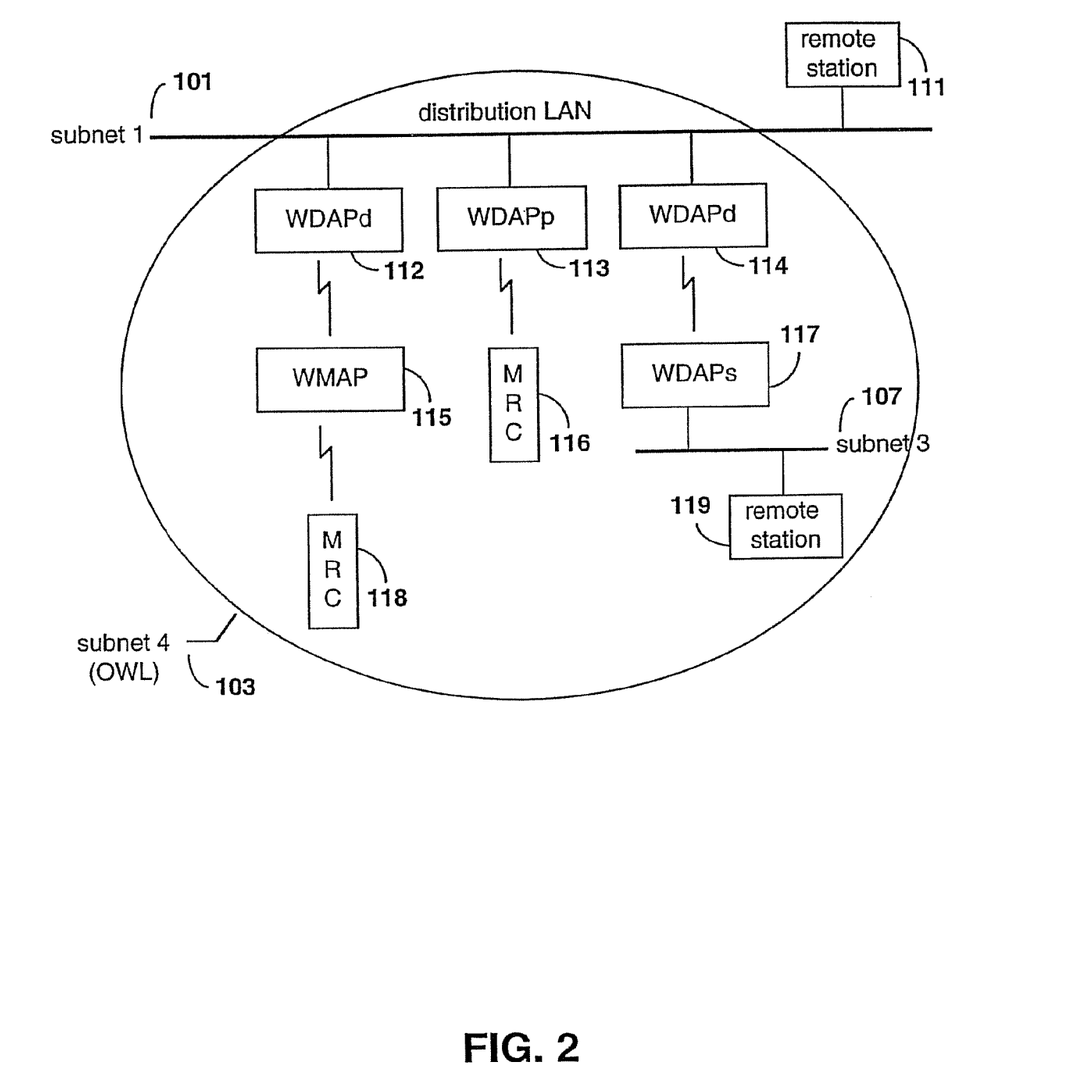
FIG. 2 shows an exemplary expanded configuration of FIG. 1, providing additional detail of the OWL radio network.

FIG. 2 shows an exemplary expanded configuration of FIG. 1, providing additional detail of the OWL radio network, the wireless subnet 105. The wireless subnet 105 provides access to the wired subnet 101, the remote wired subnet 107, and wireless communication devices, such as mobile radio-equipped computers (MRCs) 116 and 118. Other types of wireless communication devices include, but are not limited to, radio-equipped printers or other peripherals, stationary radio-equipped computers, pagers, etc. In addition, although radio frequency wireless communication is a preferred embodiment, other forms of wireless communication, such as infrared transmissions, might also be used.

The OWL radio network, such as the wireless subnet 105, provides for wireless transparent bridging via several types of wireless domain access points. In particular, each OWL subnet has a single primary wireless domain access point (WDAPp), such as the WDAPp 113. The WDAPp provides a single control point for the OWL subnet 103. The WDAPp 113 has direct access to the distribution LAN, i.e., the wired subnet 101. The WDAPp 113 forwards information, packaged in frames per IEEE 802 specification (hereinafter "802 frames"), between the wired subnet 101 and the wireless subnet 103.

In addition to a WDAPp, the OWL radio network may also be configured with one or more distributed wireless domain access points. As does the WDAPp, a distributed wireless domain access point (WDAPd) provides direct access to the wired subnet 101. However, each WDAPd in the network exists within the domain of its control point, the WDAPp. For example, as illustrated, within the domain of the WDAPp 113, a WDAPd 112 and a WDAPd 114 can be found. The WDAPd 112 and the WDAPd 114 forwards 802 frames between the wired subnet 101 and the OWL subnet 103.

As previously stated, an OWL subnet may also include wired subnets other than, and remotely located from, the distribution LAN, i.e., the wired subnet 101. For example, the wired subnet 107 represents one such remote wired subnets. Although only one is illustrated, many such remote wired subnets may exist in an OWL subnet 103.

Associated with each remote wired subnets, a secondary wireless domain access point (WDAPs) can be found. Each WDAPs serves as a bridge between a remote wired subnet and the OWL radio network. For example, a WDAPs 117 serves as a bridge between the remote wired subnet 107 and the wireless subnet 105. Thus, the WDAPs 117 forwards 802 frames between the remote wired subnet 107 and the wireless subnet 105.

As illustrated, a remote station 119 directly participates in the remote wired subnet 107 in conformance with IEEE 802 specifications. A remote station 111 similarly participates in the wired subnet 101. Each of the remote stations and wireless communication devices constitute "network nodes" in the OWL architecture. Moreover, any network node can freely communicate with any other network node. For example, the remote station 111 can freely intercommunicate with the remote station 119, MRC 116 and MRC 118. Similarly, the MRC 116 can communicate with the MRC 118 and the remote stations 111 and 119.

Wireless media access points are also used in the OWL radio network where needed. A wireless media access point (WMAP), such as a WMAP 115, is a radio equipped base station which extends the wireless coverage area of a OWL radio network, such as the wireless radio network 103, to support larger wireless coverage areas than might be desirable without the use of one or more WMAP's. A typical OWL radio network has multiple WMAP's with overlapping coverage areas. Thus, MRC's can roam between coverage areas and maintain network connectivity.

Figure 3:
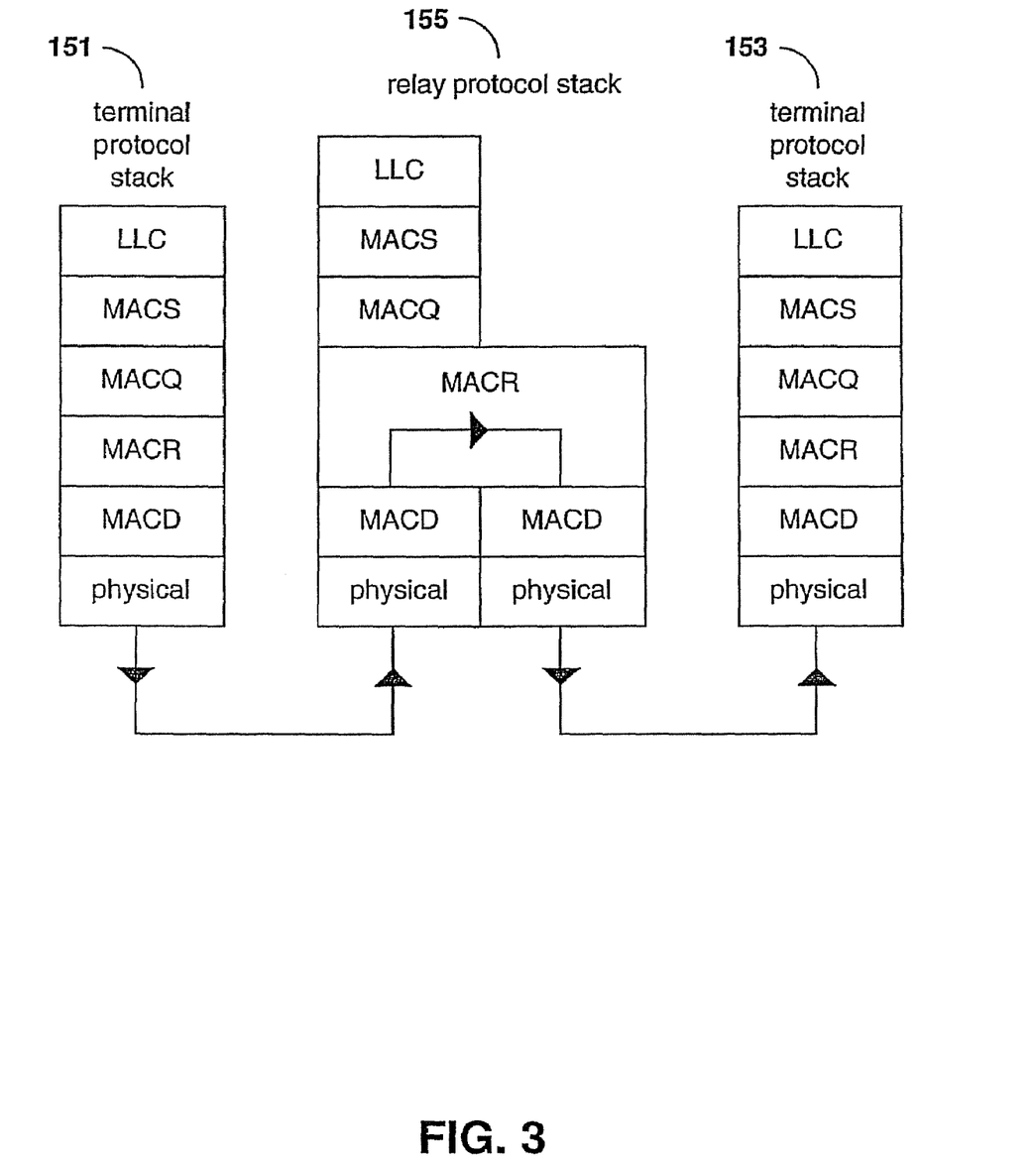
FIG. 3 illustrates the MAC protocol stacks used in an exemplary configuration of the present invention to provide for communication between two terminal nodes via a relay node.
Figure 4:
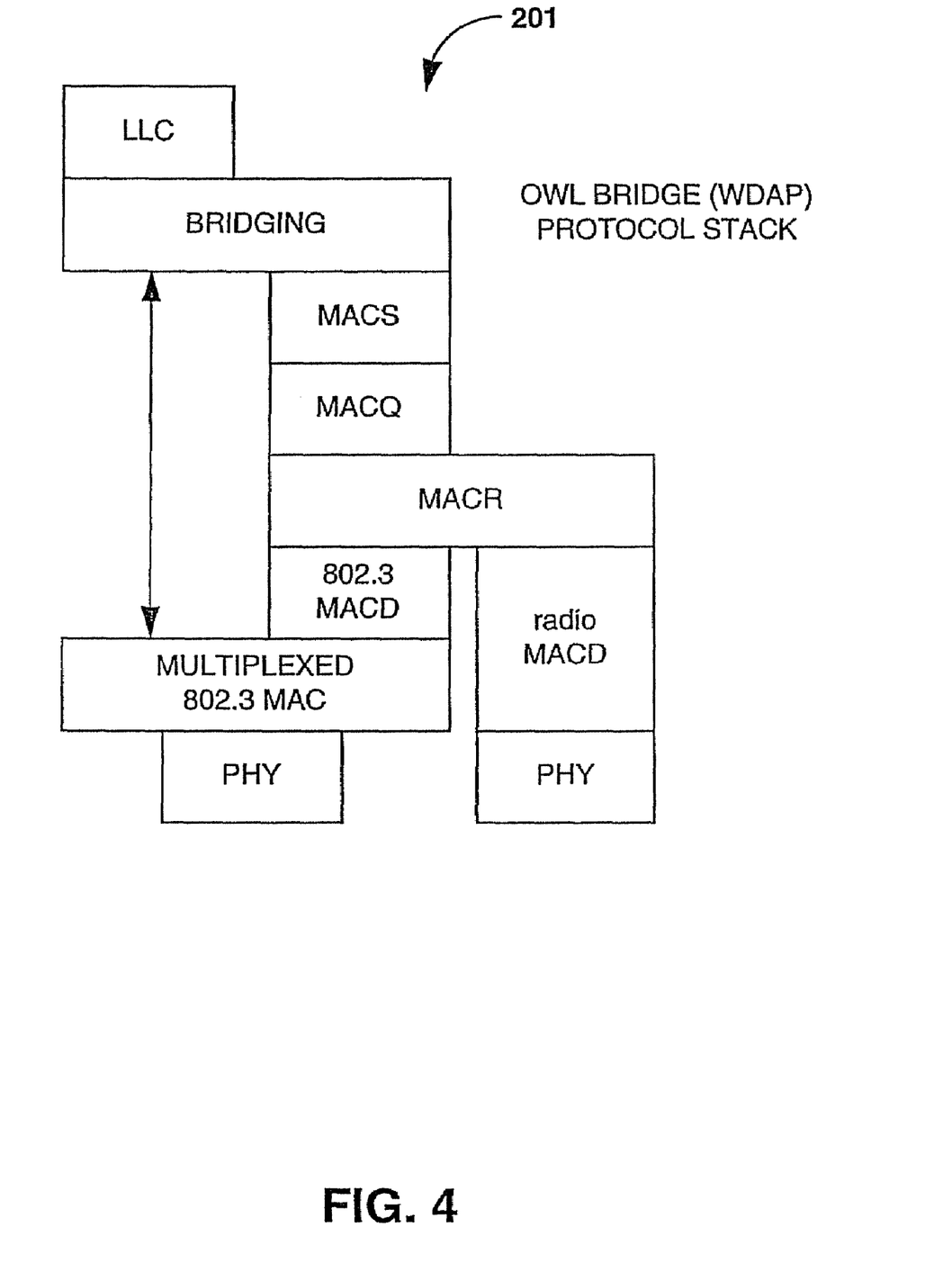
FIG. 4 illustrates an OWL bridge protocol stack used by each wireless domain access point (WDAP), an OWL bridge, to bridge the OWL radio network with an 802 type wired subnet, in an embodiment according to the present invention.
Figure 5:
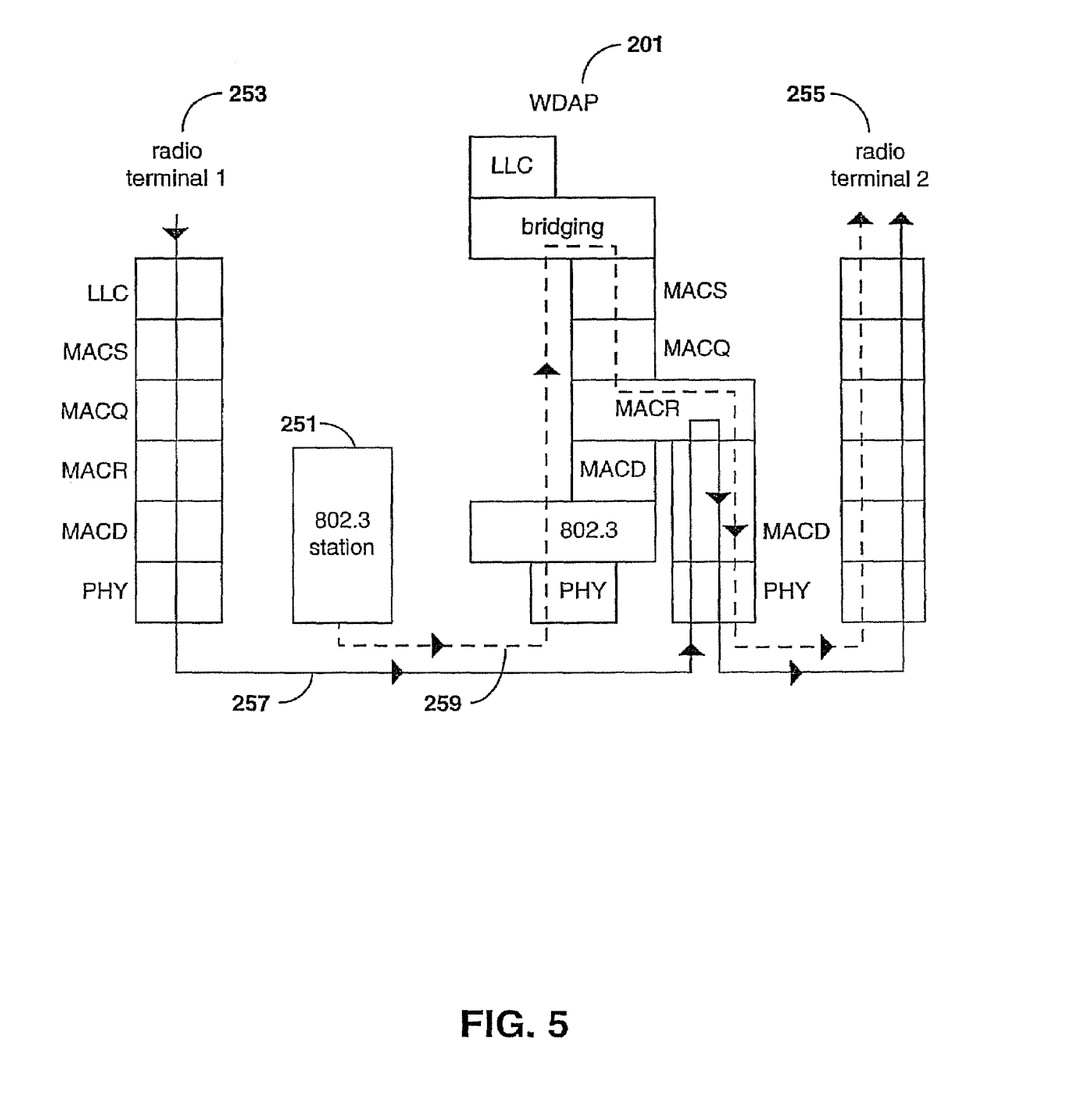
FIG. 5 is a data flow diagram illustrating how data flows through the bridge protocol stack of FIG. 4.

FIGS. 3-5 illustrates OWL protocol stacks according to the present invention which are contained in the MAC sub layer of a standard ISO protocol stack. In particular, an OWL MAC provides MAC sub layer services to the LLC sublayer of the ISO data link layer. The OWL MAC is subdivided into MAC-D, MAC-R, MAC-Q and MAC-S sublayers. The MAC-D sublayer is analogous to the data link layer in the ISO protocol stack. The MAC-D layer provides data link services to the MAC-R layer. It is responsible for channel access control and the reliable transmission of the MAC-R sublayer is analogous to the network layer in the ISO protocol stack. The MAC-R layer provides routing services to the MAC-Q layer. It is responsible for correctly routing information through the OWL subnet, which may include multiple hops and circular physical paths. Such information is formatted into MAC-R protocol data units (PDUs) for routing. The MAC-Q sublayer adds reliability to the radio network by retransmitting lost PDUs. The MAC-Q layer is responsible for discarding out-of-sequence and duplicate PDUs. The MAC-Q sublayer can be implemented as an entity in the MAC-R sublayer. The MAC-Q entities exist at entry points to the radio network. The MAC-S sublayer is responsible for providing services for security, compression, etc. The MAC-S entities exist at entry points to the OWL radio network.

As referred to herein, logical OWL nodes are MAC-R addressable entities in the OWL radio network. The logical OWL nodes functional entities which can be contained within the various network devices. A logical OWL node can be either a terminal node or a relay node. The terminal nodes are end points in the network. The MRC's 116 and 117 contain terminal nodes, i.e., an MRC contains the logical functionality of a terminal node. Relay nodes forward PDUs at the MAC-R sublayer. The WMAP 115, for example, contains a relay node.

FIG. 3 illustrates the MAC protocol stacks used in an exemplary configuration to provide for communication between two terminal nodes via a relay node. Each terminal node in the network contains a terminal protocol stack which defines the terminal node as a network end-point. Each relay node in the network also contains a protocol stack, the "relay protocol stack", which defines the relay node as a PDU forwarding entity.

For example, as illustrated, two terminal nodes may communicate with each other via a relay node. The arrows shown represent the flow of data from a first terminal node (using a terminal protocol stack 151) to a second terminal node (using a terminal protocol stack 153) via a relay node (using a relay protocol stack 155). The upper layers of the relay protocol stack 155 are used to process PDUs addressed to the relay node.

FIG. 4 illustrates another type of protocol stack used in the network. An OWL bridge protocol stack 201 is illustrated which is used by each wireless domain access point (WDAP), an OWL bridge, to bridge a wireless subnet to an 802 type wired subnet. Each bridge protocol stack, such as bridge protocol stack 201, contains a relay protocol stack. In addition, the 802.3 MAC-D sublayer is used to send OWL PDUs over an 802.3 link that is part of the OWL radio network. The MAC-Q and MAC-S sublayers serve as proxy MAC-Q and MAC-S entities for stations, such as the remote stations 111 and 119 (FIG. 2), on the 802.3 subnet. For convenience, the MAC-Q and MAC-S sublayers also service PDUs for the local WDAP 802 address.

FIG. 5 illustrates how data flows through the bridge protocol stack of FIG. 4. A dashed line 259 represents the path a PDU takes as it travels from a station 251 on an 802.3 LAN to a terminal 255 in the OWL radio network. A WDAP, using the bridge protocol stack 201, bridges the PDU from the 802.3 subnet to the radio subnet. A solid line 257 represents the path a PDU takes as it travels from a terminal 253 to the terminal 255 wherein both terminals are in the radio network. In this example, because the path is contained in the radio network, the PDU does not have to be bridged.

In general, PDUs are bridged across subnet boundaries, and PDUs are routed within the radio network. A bridging entity in a WDAP uses a forwarding database to determine if a PDU should be bridged from one subnet to another subnet. A forwarding database contains a list of 802 addresses associated with each subnet to which the WDAP is attached. A MAC-R entity uses a routing table to determine how a PDU should be routed within an OWL subnet.

Further detail regarding this embodiment can be found in the attached Appendices A and B. Appendix A provides further detail regarding the OWL network architecture, while Appendix B describes the network frame formats used in communication exchanges.

Figure 6:
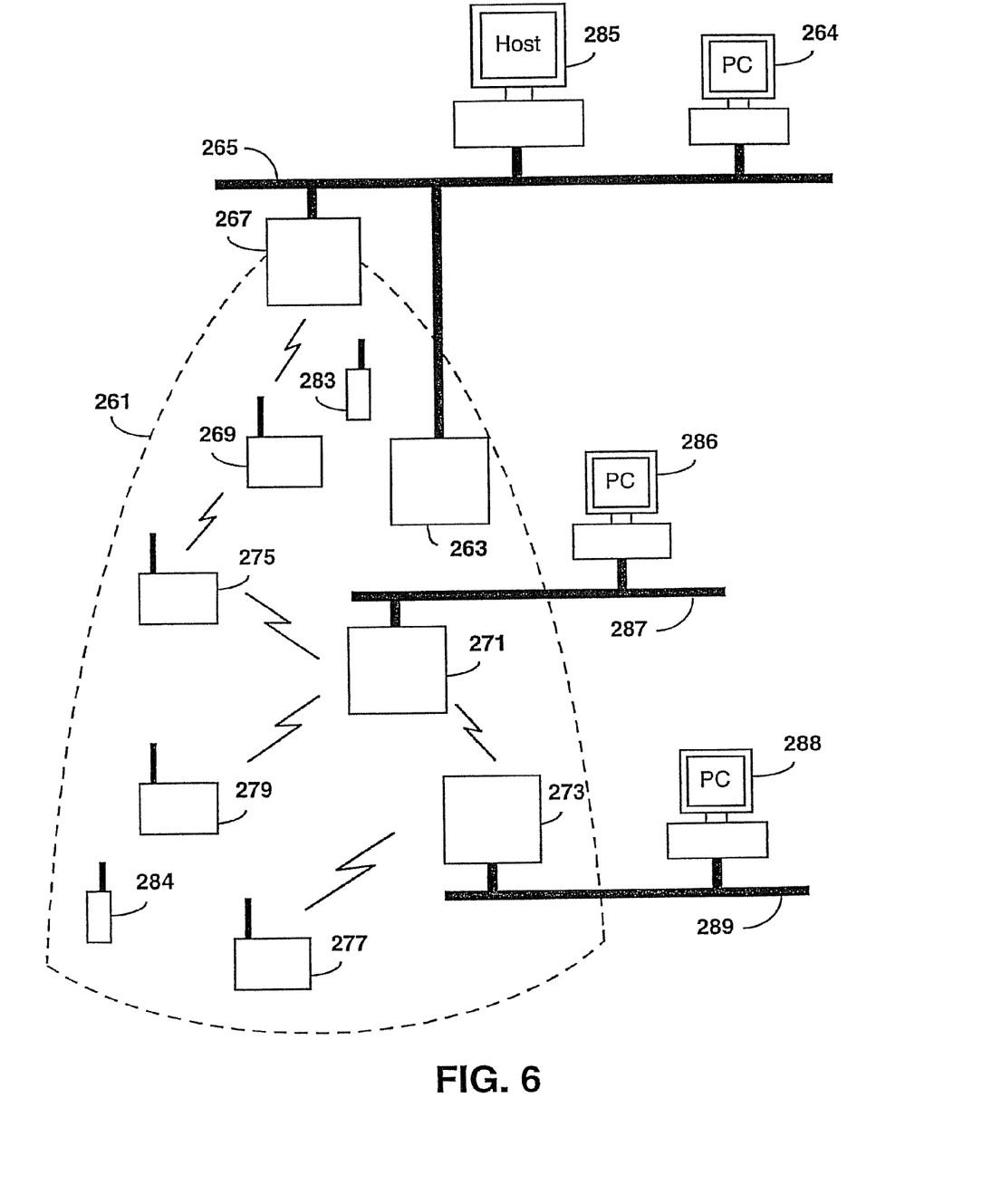
FIG. 6 illustrates an exemplary configuration of the OWL architecture according to one embodiment of the present invention.

FIG. 6 illustrates an exemplary configuration of the OWL architecture according to the present invention. Therein, a wired subnet 265 and remote wired subnets 287 and 289, are configured in accordance with IEEE 802 standards. A WDAPp 267, utilizing the bridging protocol stack shown in FIG. 4, acts as a spanning tree root node, providing access between an OWL radio network 261 and the wired subnet 265. Note that a WDAPd 263 is also illustrated which uses a bridging protocol stack. The WDAPd 263 could instead be used as the root of the spanning tree (becoming the network WDAPp) should the WDAPp break down. In addition, two exemplary remote stations, a host computer 285 and a personal computer 264, are connected to the wired subnet 265.

A WDAPs 271 constitutes an access point to and from the remote wired subnet 287. Similarly, a WDAPs 273 constitutes an access point to and from the remote wired subnet 289. Both WDAPs's utilize the bridge protocol stack of FIG. 3. Moreover, each remote wired subnet 287 and 289 illustrate the participation of a remote station, a personal computer 286 and 288, respectively. Also, wireless communication devices, such as an MRC 283 and an MRC 284, can move through the OWL radio network 261 while maintaining network connectivity. Any wireless communication device can communicate with any other wireless communication device or with any remote station. Similarly, any remote station can communicate with any other remote station or with any wireless communication device.

A plurality of intermediate wireless access points, i.e., the WMAP's 269, 275, 277 and 279, along with the wired access points, i.e., the WDAP's 267, 263, 271 and 273, providing for communication among any of the remote stations and wireless communication devices. Because WDAP's are wired to corresponding wired subnets, they are referred to herein as a "wired access points" even though WDAP's also participate wirelessly within the OWL radio network. Specifically, the plurality of intermediate wireless access points and the wired access points, together, form a spanning tree which provides for routing through the OWL radio network.

Specifically, nodes in an OWL radio network are organized into a network spanning tree. A WDAPp serves as a root of the spanning tree, while PDU's are routed along branches of the spanning tree. Routing toward the root is referred to herein as "downstream" routing. Routing away from the root is referred to as "upstream" routing. Referring to FIG. 6, the WDAPp 267 constitutes the root of the spanning tree formed within the OWL radio network 261. Communication flowing upstream, away from the WDAPp 267, might include a plurality of relay points along the way to reach a destination. For example, to reach the personal computer 286, data from the personal computer 264 first travels along the wired subnet 265 to the root of the spanning tree, i.e., to the WDAPp 267. The WDAPp 267, using a spanning tree routing table, identifies that the WMAP 269 is the next relay point upstream to the personal computer 286. Therefore, the WDAPp 267 forwards the data upstream to the WMAP 269. Upon receipt, the WMAP 269 similarly identifies the WMAP 275 and forwards the data upstream. In turn, the WMAP 275 forwards the data to the WDAPs 271. Finally, the WDAPs 271 relays the data along the remote wired subnet to the personal computer 286.

A spanning tree, which provides the data pathways throughout the OWL radio network, is stored and maintained by each participant in the OWL radio network. Each network node stores and modifies information which specifies how local communication traffic should flow. Optimal spanning trees assure efficient, adaptive (dynamic) routing of information without looping.

Nodes in the OWL radio network are generally categorized as being attached or unattached to the network spanning tree. Upon initialization of an OWL radio network, only the root node is attached. A single WDAP can be designated to contain the root node, or multiple root candidates can negotiate to determine which node assumes the root status. Once the root is designated, the WDAP containing the root node, i.e., the WDAPp, begins periodically broadcasting messages offering attachment. These messages are referred to as "HELLO response PDU's". Unattached nodes, i.e., other WDAP's or WMAP's, receiving the Hello response PDU's may attach to the OWL radio network via the WDAPp. With the exception of terminal nodes, each network node that becomes attached also begins periodically transmitting Hello response PDU's. The nodes receiving Hello response PDU's from newly attached nodes may attach to the network via the newly attached nodes. This process continues until all of the network nodes are attached. Moreover, to attach to the network, an "Attach request PDU" must be sent and relayed downstream toward the root node. In response, the root sends an "Attach response PDU" back through the network to confirm the attachment. Upon receiving the Attach request PDU, each network node places an entry in a spanning tree routing table indicating the identity of both the requesting node and the node which last transmitted (relayed) the request. In this manner, routing tables can be constructed and maintained. As described in the Appendix A, other types of PDU's, i.e., Registration or Data request PDU's, are also be used to create and modify routing tables.

Using the spanning tree routing table, any network node can determine whether any other network node exists upstream or not. In particular, if an entry exists, the destination node must have previously sent a PDU (possibly the Attach request PDU) through that relay node in a downstream pathway to root node. Thus, if the entry exists, the relay node routes the PDU upstream per routing table instruction toward the destination node. However, if no entry for the destination node exists, the relay node can not determine the location of the destination node. Therefore, the relay node sends the PDU downstream toward the root node. If any node along the downstream pathway identifies the destination node in its routing table, that node relays the PDU upstream toward the destination. More detail regarding this entire procedure can be found in Appendix A, for example at pages 17-22.

Figure 7:
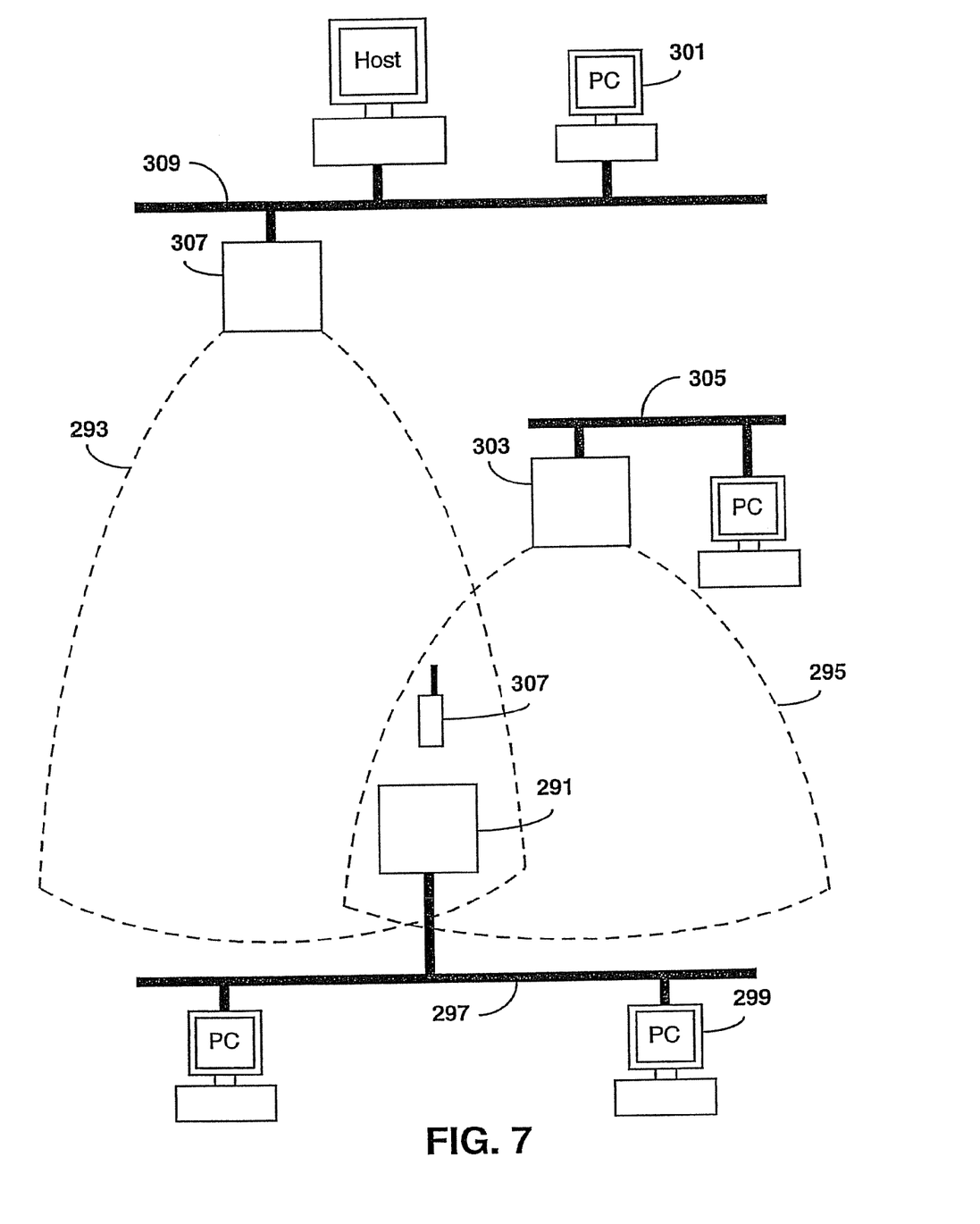
FIG. 7 illustrates an alternate embodiment of the present invention wherein a WDAPs participates in more than one OWL radio network.

FIG. 7 illustrates an alternate embodiment of the present invention wherein a WDAPs 291 participates in more than one OWL radio network. Specifically, the WDAPs 291 participates in OWL radio networks 293 and 295. For example, a personal computer 299 initiates communication to another remote station, a PC 301, by transmitting a message upon a wired subnet 297. Upon receiving the message, the WDAPs 291 checks its routing table and, because no entry is found, routes the message downstream through both the OWL radio networks 293 and 295. When the upstream routing in the OWL network 295 reaches a WDAPp 303, an entry for the personal computer 301 is still not found. Therefore, the WDAPp 303 unicasts the message onto a wired subnet 305. Because the PC 101 does not reside on the subnet 305, the message reaches a dead-end and is ignored. However, when the message reaches a WDAPp 307, and the WDAPp 307 does not find an entry for the personal computer 301, it unicasts the message onto a wireless subnet 309 for receipt by the personal computer 301.

Figure 8:
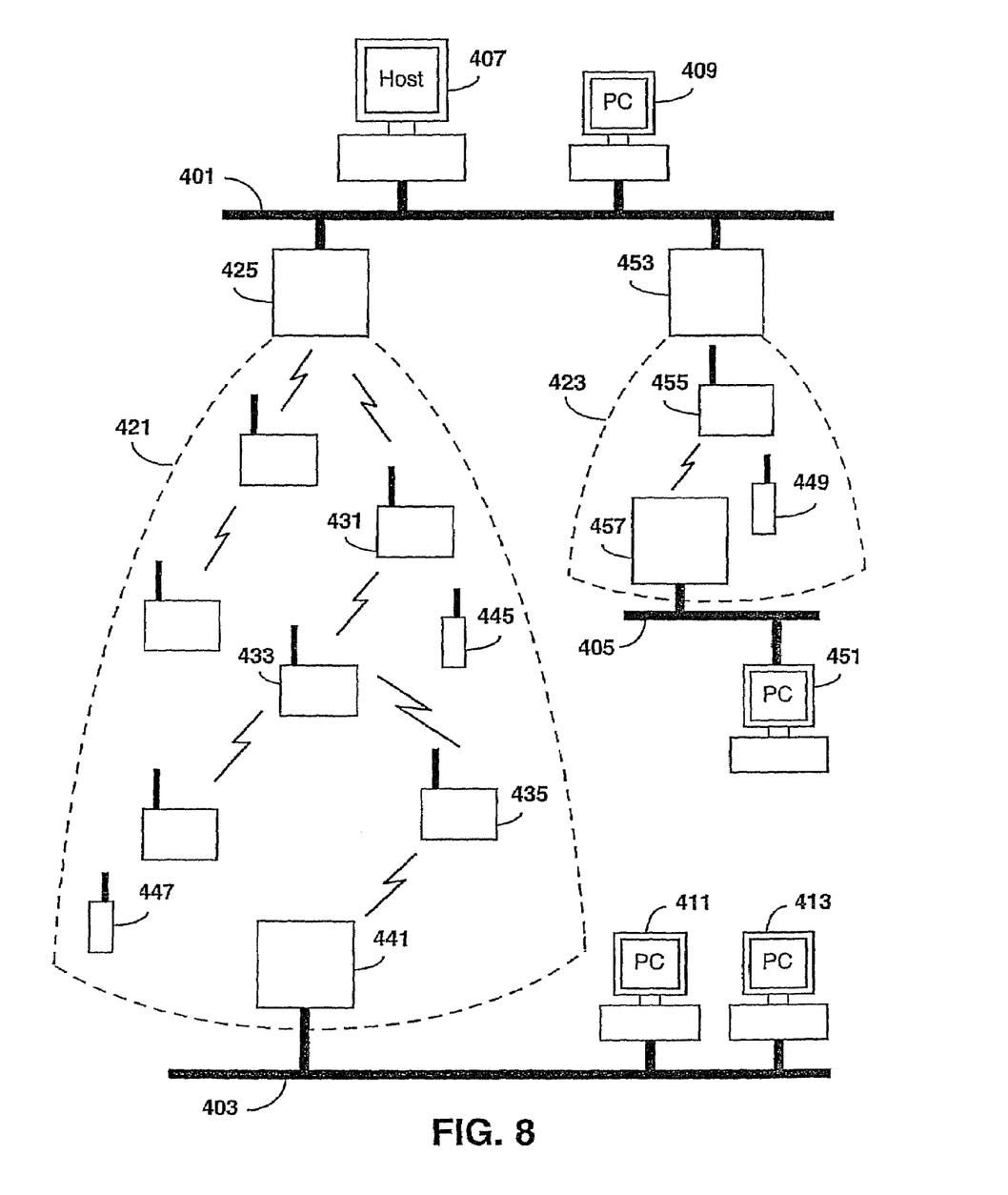
FIG. 8 is a diagram illustrating yet another variation of the OWL architecture according to another embodiment of the present invention wherein two OWL radio networks are used.

FIG. 8 is a diagram illustrating yet another variation of the present invention wherein two OWL radio networks are used. Specifically, a WDAPp 425 provides access for communication between a wired subnet 401 and a remote wired subnet 403. Utilizing a spanning tree configuration, the plurality of intermediate wireless access points, such as WMAP 431, 433 and 435, provide a communication pathway between a WDAPs 441 and the WDAPp 425. Together, the WMAP's, the WDAPp 425 and the WDAPs 441 provide for communication among a plurality of wireless communication devices, such as MRC's 445 and 447, and the remote stations on the subnets 401 and 403, such as a host computer 407 and personal computers 409, 411 and 413.

Similarly, communication interconnectivity is provided via a second OWL radio network 423. The second network 423 provides for communication flow between the wired subnet 401 and a remote wired subnet 405 via a WDAPp 453, WDAPs 457 and a WMAP 455. Again full communication among a wireless communication device 449, a personal computer 451, the host computer 407 and the personal computer 409 is provided for.

Additionally, communication among remote stations on the remote subnets 403 and 405 and wireless communication devices in either network 421 or 423 is provided. For example, the host computer 407 may communicate to the personal computer 413 via the OWL radio network 421. To do so, the host computer 407 first transmits a message destined for the personal computer 413 onto the wired subnet 401. In response, the WDAPp 425 receives the message, identifies a routing table entry for the personal computer 413, and, in one exemplary spanning tree configuration, routes the message up-stream toward the personal computer 413 via a wireless transmission to the WMAP 431. When the WMAP 431 receives the message from the down-stream WDAPp 425, the WMAP 431 checks with its routing table. Upon finding a routing table entry for the personal computer 413, the WMAP 431 identifies the WMAP 433 as the next relay point in the pathway to the personal computer 413. Thus, via wireless transmission, the WMAP 433 relays the message to the WMAP 433. Upon receiving the message, the WMAP 433 similarly identifies a routing table entry for the personal computer 413, and routes the message to the WMAP 435. In turn, the WMAP 435 routes the message to the WDAPs 441. The WDAPs 441 finally sends the message to the personal computer 413 via the wired subnet 403. Together, the WDAPp 425, WMAP's 431-435 and WDAPs 441 thus provide a communication pathway between the host computer 407 and the personal computer 413.

As noted previously, each WMAP and each WDAP maintains a spanning tree routing table, i.e., a forwarding database, which specifies how local communication traffic should flow therethrough. Upon receipt of a message, the WMAP or WDAP first identifies the destination of the message. The message destination is then compared with the spanning tree routing table. If an entry in the routing table exists for the message destination, corresponding information regarding the next relay point in the pathway to the message destination is retrieved from the routing table. Such information includes the handle of the next relay point and the communication channel required, for example.

As another example, the personal computer 411 may communicate with the personal computer 451 by utilizing both of the OWL radio networks 421 and 423. Specifically, the personal computer 411 transmits a message to the personal computer 451 on the wired subnet 403. In response, the WDAPs 441 receives the message, recognizes that the personal computer 451 is not within its spanning tree routing table, and routes the message downstream to the WMAP 435. The WMAP 435 receives the message from the WDAPs 441, recognizes that the personal computer 451 is not within its routing table, and thus routes the message to its downstream ancestor, i.e., the WMAP 433. Similarly, upon receiving the message, and, because no entry exists in its routing table, the WMAP 433 forwards the message downstream to its spanning tree ancestor, the WMAP 431. Again, finding no routing table entry for the personal computer 451, the WMAP 431 routes the message to the spanning tree root node, i.e., the WDAPp 425. In turn, finding no routing table entry for the personal computer 451, the WDAPp 425, depending on pre-determined program control, may: 1) do nothing, aborting the communication attempt; 2) unicast the message on all ports except the one from which the message was received, i.e., floods the ports with the message; 3) unicast the message on selected ports; or 4) consult a routing control field in the message itself to determine which of the above three options to choose.

Assuming program control permits, the WDAPp 425 unicasts the message intended for the personal computer 451 onto the wired subnet 401. Upon receiving the unicast message, the WDAPp 453 locates the personal computer 451 in its routing table, and routes the message upstream to the WMAP 455. The WMAP 455 similarly identifies a personal computer 451 entry, and routes to the next upstream node, i.e., to a WDAPs 457. Finally, the WDAPs 457, identifying a personal computer 451 routing table entry, sends the message via the remote wired subnet 405 to the personal computer 451.

The illustrated communication network similarly supports communication among wireless communication devices, such as MRC's 445, 447 and 449, and remote stations, such as the host computer 407 and the personal computers 409, 411, 413 and 451.

As previously articulated, further detail regarding the present invention can be found with reference to the Appendices A and B. Moreover, additional detail may also be found in the patent applications cited above under the heading "Incorporation By Reference". Such applications are incorporated herein by reference in their entirety.

As is evident from the description that is provided above, the implementation of the present invention can vary greatly depending upon the desired goal of the user. However, the scope of the present invention is intended to cover all variations and substitutions which are and which may become apparent from the illustrative embodiment of the present invention that is provided above, and the scope of the invention should be extended to the claimed invention and its equivalents.

What is claimed is:

1. A multi-hop communication system, comprising:
    a plurality of wireless bridging communication devices organized to form one or more wireless communication pathways; and
    a plurality of roaming mobile wireless communication devices operatively coupled to the plurality of wireless bridging communication devices, wherein the roaming mobile wireless communication devices wirelessly communicate with each other over the one or more wireless communication pathways, and wherein at least one of the plurality of wireless bridging communication devices periodically broadcasts wirelessly a message, wherein any of the plurality of wireless bridging communication devices and the plurality of roaming mobile wireless communication devices can communicate with any other of the plurality of wireless bridging communication devices and the plurality of roaming mobile wireless communication devices.

2. The multi-hop communication system according to claim 1, wherein the plurality of roaming mobile wireless communication devices comprises a first mobile device and a second mobile device, and wherein the first mobile device wirelessly communicates with the second mobile device via a wireless communication pathway through at least two of the plurality of wireless bridging communication devices.

3. The multi-hop communication system according to claim 1, wherein each of the plurality of wireless bridging communication devices periodically broadcasts wirelessly a respective message.

4. The multi-hop communication system according to claim 1, wherein at least one of the roaming mobile wireless communication devices wirelessly responds to at least one of the periodically broadcasted messages.

5. The multi-hop communication system according to claim 1, wherein each of the plurality of wireless bridging communication devices comprises a storage device in which resides a respective routing table.

6. The multi-hop communication system according to claim 5, wherein entries in the respective routing tables are updated.

7. The multi-hop communication system according to claim 1, wherein the plurality of wireless bridging communication devices and the plurality of roaming mobile wireless communication devices are part of a wireless local area network.

8. The multi-hop communication system according to claim 1, wherein the plurality of wireless bridging communication devices dynamically form one or more wireless communication pathways.

9. The multi-hop communication system according to claim 1, wherein the plurality of wireless bridging communication devices form one or more self-healing wireless communication pathways.

10. The multi-hop communication system according to claim 1, wherein the plurality of wireless bridging communication devices provide adaptive routing of information.

11. The multi-hop communication system according to claim 1, wherein the plurality of wireless bridging communication devices provide dynamic routing of information.

12. The multi-hop communication system according to claim 1, wherein one of the plurality of wireless bridging communication devices initiates the formation of a wireless local area network.

13. The multi-hop communication system according to claim 1, wherein one of the plurality of wireless bridging communication devices initiates the formation of a wireless local area network by periodically broadcasting wirelessly a message.

14. The multi-hop communication system according to claim 1, wherein multi-hop communication system employs spread spectrum communications.

15. A multi-hop communication system, comprising:
a plurality of wireless bridging communication devices organized to form one or more wireless communication pathways; and
a plurality of roaming mobile wireless communication devices operatively coupled to the plurality of wireless bridging communication devices,
wherein the roaming mobile wireless communication devices wirelessly communicate with each other over the one or more wireless communication pathways,
wherein at least one of the plurality of wireless bridging communication devices periodically broadcasts wirelessly a message,
wherein the plurality of wireless bridging communication devices form a first wireless communication pathway,
wherein at least one of the wireless bridging communication devices fails, and
wherein the plurality of wireless bridging communication devices form a second wireless communication pathway that does not include the at least one of the failed wireless bridging communication devices.

16. The multi-hop communication system according to claim 15, wherein multi-hop communication system employs spread spectrum communications.

17. A multi-hop communication system, comprising:
a plurality of wireless bridging communication devices organized to form one or more wireless communication pathways; and
a plurality of roaming mobile wireless communication devices operatively coupled to the plurality of wireless bridging communication devices,
wherein the roaming mobile wireless communication devices wirelessly communicate with each other over the one or more wireless communication pathways,
wherein at least one of the plurality of wireless bridging communication devices periodically broadcasts wirelessly a message,
wherein the plurality of wireless bridging communication devices form one or more self-healing wireless communication pathways,
wherein the roaming mobile wireless communication devices that wirelessly communicate with each other over the one or more self-healing wireless communication pathways are unaware of re-routing due to a failure in at least one of the wireless bridging communication devices.

18. The multi-hop communication system according to claim 17, wherein multi-hop communication system employs spread spectrum communications.

19. A multi-hop communication system, comprising:
a plurality of wireless bridging communication devices organized to form one or more wireless communication pathways; and
a plurality of roaming mobile wireless communication devices operatively coupled to the plurality of wireless bridging communication devices,
wherein the roaming mobile wireless communication devices wirelessly communicate with each other over the one or more wireless communication pathways,
wherein at least one of the plurality of wireless bridging communication devices periodically broadcasts wirelessly a message,
wherein one of the plurality of roaming mobile wireless communication devices communicates over a first wireless communication pathway over a first subset of the plurality of wireless bridging communication devices, and wherein the one of the plurality of roaming mobile wireless communication devices moves to another location such that the one of the plurality of roaming mobile wireless communication devices communicates over a second wireless communication pathway over a second subset of the plurality of wireless bridging communication devices.

20. The multi-hop communication system according to claim 19, wherein the plurality of wireless bridging communication devices form one or more self-healing wireless communication pathways.

21. The multi-hop communication system according to claim 19, wherein multi-hop communication system employs spread spectrum communications.

22. A multi-hop communication system, comprising:
a plurality of wireless bridging communication devices organized to form one or more wireless communication pathways; and
a plurality of roaming mobile wireless communication devices operatively coupled to the plurality of wireless bridging communication devices,
wherein the roaming mobile wireless communication devices wirelessly communicate with each other over the one or more wireless communication pathways,
wherein at least one of the plurality of wireless bridging communication devices periodically broadcasts wirelessly a message,
wherein the roaming plurality of roaming mobile wireless communication devices comprises two roaming mobile wireless communication devices,
wherein the plurality of wireless bridging communication devices comprises a particular wireless bridging communication device,
wherein the two roaming mobile wireless communication devices are operatively coupled to the particular wireless bridging communication device, and
wherein the two roaming mobile wireless communication devices communicate with each other without the particular wireless bridging communication device forwarding the communication to a parent node of the particular wireless bridging communication device.

23. The multi-hop communication system according to claim 22, wherein the plurality of wireless bridging communication devices form one or more self-healing wireless communication pathways.

24. The multi-hop communication system according to claim 22, wherein multi-hop communication system employs spread spectrum communications.

* * * * *